Dec. 19 1922.  
W. H. BANKS.  
GALLOPING VELOCIPEDE.  
ORIGINAL FILED NOV. 13, 1920.  
1,439,394

INVENTOR  
William H. Banks  
by Macleod, Calver, Copeland & Dike  
Attys.

Patented Dec. 19, 1922.

1,439,394

UNITED STATES PATENT OFFICE.

WILLIAM H. BANKS, OF WINTHROP, MASSACHUSETTS.

GALLOPING VELOCIPEDE.

Application filed November 13, 1920, Serial No. 423,942.   Renewed September 17, 1921.   Serial No. 501,424.

*To all whom it may concern:*

Be it known that I, WILLIAM H. BANKS, a citizen of the United States, residing at Winthrop, county of Suffolk, State of Massachusetts, have invented a certain new and useful Improvement in Galloping Velocipedes, of which the following is a specification, reference being had therein to the accompanying drawings.

The object of my invention is to provide a child's velocipede in which during the movement of the velocipede the rider will be given a galloping movement something after the manner of the movement given by a galloping horse.

The invention will be fully understood from the following description when taken in connection with the accompanying drawings, and the novel features thereof will be pointed out and clearly defined in the claim at the close of this specification.

In the drawings, Fig. 1 is a side elevation of a velocipede embodying the invention.

Figure 1:
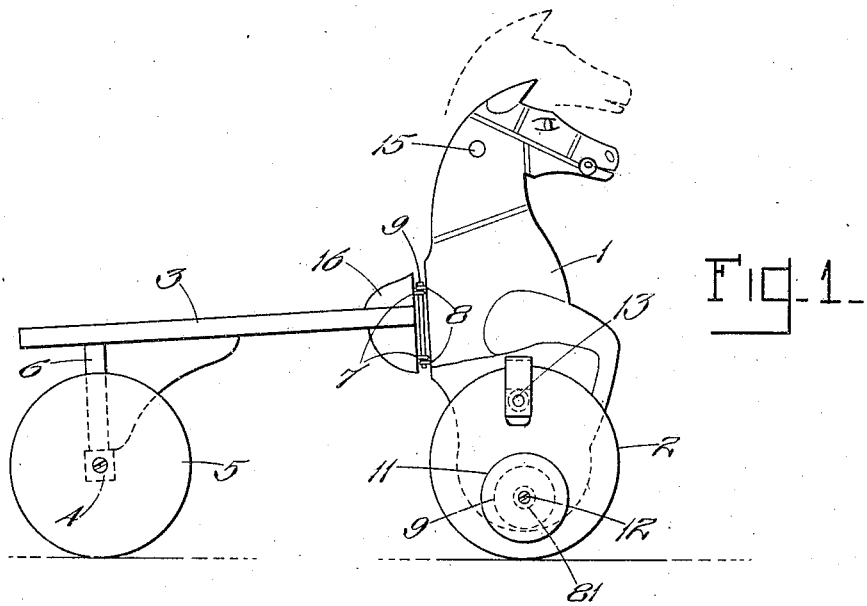
Figure 2:
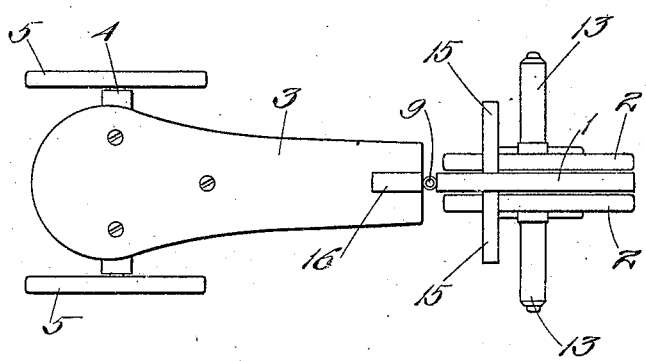
Fig. 2 is a plan view of the device shown in Fig. 1.

Referring now to the drawings, 1 represents the forepart of the device which is shaped to represent a horse's head and forepart, and is eccentrically connected with the two forward driving wheels 2—2, as will be more particularly hereinafter described. The said forepart portion 1 takes the place of the steering portion of a velocipede and is pivotally connected with a seat portion 3, the rear portion of the seat being mounted upon the rear axle 4 on which are mounted the rear wheels 5—5. Preferably the seat 3 is connected with the axle 4 by a bracket 6 which is rigidly connected both with the axle 4 and the seat 3 to elevate the rear end of the seat to the proper height.

The forward part 1 may be connected with the seat member 3 by any suitable swivel connection. As shown in the drawings, the forward end of the seat member is provided with a bracket 16. Said bracket 16 is provided with screw eyes 7 and the member 1 is provided with screw eyes 8 in such manner that the screw eyes of one member will underlie those of the other, and the hinge pin 9 passes through the screw eyes to form a pivot connection. As stated above, however, any suitable swivel or hinge connection may be provided.

Preferably the body 1 is made by shaping it out of a board for cheapness of construction, and its lower end extends down between the driving wheels 2—2, with which it is connected by a shaft or axle 81, which is eccentrically journalled in the wheels 2—2. Preferably bearings are provided for the shaft, said bearings consisting of circular disks 9 which are loosely fitted in circular openings 10 in the faces of the wheels 2—2. Preferably the shaft can turn loosely in the bearing disks 9, and the disks 9 are capable of rotating in the holes 10 in which they are mounted. This is for the purpose of reducing the friction. In order to retain the disk bearings 9 in position, a cap 11 is screwed onto the end of the shaft as by screws 12. The shaft 81 passes loosely through the body 1, so that the shaft 81 can turn easily. There will be occasion for very little play between the shaft 81 and the bearing disk 9, or between the bearing disk 9 and the wheel 2, but there is sufficient play for whatever may be necessary.

Eccentrically secured to each of the wheels 2—2 is a pedal 13 which preferably has a stirrup 14 connected with it.

Figure 3:
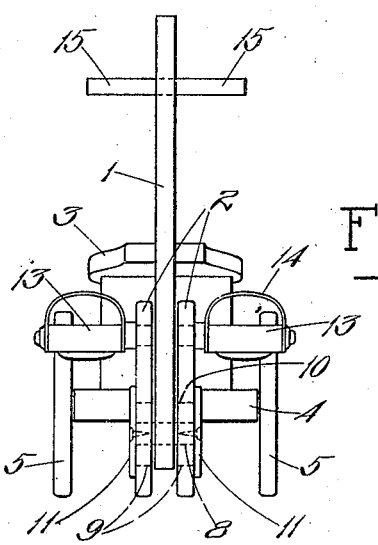
Fig. 3 is a front elevation.

In operation the rider will operate both pedals at the same time, so that both pedals go down and both up at the same time which is directly the reverse of an ordinary velocipede or bicycle in which when one pedal is down the other pedal is up. In this case when both pedals are in the top position as shown in Figures 1 and 3, the shaft will be in its lowermost position, and therefore the body portion 1 of the horse will be in its lowermost position, as shown in full lines in Figure 1. When the wheels make a half rotation so as to bring the pedals to the bottom and the shaft to its uppermost position, the body portion 1 will rise to the dotted line position shown in Figure 1. It will thus be seen that at each rotation of the wheels the forward part of the horse and the forward portion of the seat will rise and fall; therefore, while the velocipede is travelling the whole seat frame 3 and the front body portion 1 will rock on the rear shaft 4 as a pivot and the rider and horse's head will have a rising and falling movement very closely imitating that of the rise and fall of a rider on the back of a galloping horse. The child will have the pleasure of forward travel as well as of the rocking movement.

Suitable handle bars 15—15 are provided which for simplicity of construction may consist of a single stick passed horizontally through the head of the body member 1, as for instance up in the head of the horse-shaped figure.

Each wheel 2—2 may be formed by sawing a circular disk out of a board, and the disk member 9 may be formed by sawing it out of the wheel disk 2 of the proper shape to be inserted back again for the purpose already described. In this way the disk wheel may be made very cheaply with a minimum waste of material. As already stated the body portion may be made out of a board which may be easily shaped to represent in side contour the appearance of the forepart of the horse.

The whole thing may thus be very cheaply made entirely of wood with the exception of the swivel connection between the seat and the forepart and the stirrups or pedals.

What I claim is:—

A child's velocipede having a front body portion shaped in imitation of the forepart of an animal, a seat portion with which said body portion has a swivel connection, a pair of disks which form wheels between which the body portion lies, an axle on which said body portion is journalled, disk bearings for said axle fitted loosely in said wheels and eccentrically thereto in corresponding position in each of said wheels, said shaft being journalled in said eccentric bearings, and pedal connections with said wheels, whereby the said wheels may be rotated in unison, and a rear wheel connection for said seat.

In testimony whereof I affix my signature.

WILLIAM H. BANKS.